(12) United States Patent
Wiechers (10) Patent No.: US 10,896,400 B2
(45) Date of Patent: Jan. 19, 2021

(54) SETUP OF A COMMUNICATION LINK TO A USER APPARATUS VIA AN ACCESS CONTROL APPARATUS

(71) Applicant: Ralph Wiechers, Mayschoß (DE)

(72) Inventor: Ralph Wiechers, Mayschoß (DE)

(73) Assignee: Deutsche Post AG, Bonn (DE)

( * ) Notice: Subject to any disclaimer, the term of this patent is extended or adjusted under 35 U.S.C. 154(b) by 1210 days.

(21) Appl. No.: 15/213,560

(22) Filed: Jul. 19, 2016

(65) Prior Publication Data

US 2017/0024693 A1 Jan. 26, 2017

(30) Foreign Application Priority Data

Jul. 20, 2015 (DE) .......................... 10 2015 111 711

(51) Int. Cl.
| | |
|---|---|
| *G06F 21/00* | (2013.01) |
| *G06Q 10/08* | (2012.01) |
| *G07C 9/00* | (2020.01) |
| *G07C 9/27* | (2020.01) |
| *H04W 12/08* | (2009.01) |

(52) U.S. Cl.
CPC ..... *G06Q 10/0833* (2013.01); *G07C 9/00896* (2013.01); *G07C 9/27* (2020.01); *H04W 12/08* (2013.01)

(58) Field of Classification Search
CPC .......................... G06Q 10/0833; H04W 12/08
USPC .......................................................... 705/50
See application file for complete search history.

(56) References Cited

U.S. PATENT DOCUMENTS

| | | | | |
|---|---|---|---|---|
| 6,570,488 | B2* | 5/2003 | Kucharczyk | A47G 29/141 340/5.2 |
| 7,479,899 | B2* | 1/2009 | Horstemeyer | B60R 25/102 340/994 |
| 10,078,810 | B2* | 9/2018 | Klingenberg | G06Q 10/083 |
| 10,210,474 | B2* | 2/2019 | Robinson | G06F 21/62 |
| 2002/0180582 | A1 | 12/2002 | Nielsen | |
| 2006/0224512 | A1* | 10/2006 | Kurakata | G06Q 10/00 705/50 |
| 2010/0179685 | A1* | 7/2010 | Meyer | B07C 3/18 700/227 |
| 2011/0053557 | A1 | 3/2011 | Despain et al. | |
| 2014/0035721 | A1 | 2/2014 | Heppe et al. | |
| 2015/0120602 | A1* | 4/2015 | Huffman | G06Q 10/083 705/339 |

FOREIGN PATENT DOCUMENTS

| | | |
|---|---|---|
| CN | 101127625 A | 2/2008 |
| CN | 102611624 A | 7/2012 |
| DE | 41 27 316 C1 | 6/1992 |

(Continued)

*Primary Examiner* — Gautam Ubale
*Assistant Examiner* — Michael I Ezewoko
(74) *Attorney, Agent, or Firm* — Reinhart Boerner Van Deuren P.C.

(57) ABSTRACT

A method, performed by an access control apparatus, that includes the following steps: obtaining a request to set up a communication link, wherein the request contains authorization information; checking the authorization of the request to set up a communication link at least in part on the basis of the authorization information; and causing setup of and/or setting up a communication link to a first user apparatus only if the result of the checking is that the request to set up a communication link is authorized.

18 Claims, 5 Drawing Sheets

(56) References Cited

FOREIGN PATENT DOCUMENTS

| | | |
|---|---|---|
| DE | 43 01 039 C2 | 6/1995 |
| DE | 10 2011 083 817 A1 | 4/2013 |
| EP | 2 891 433 A1 | 7/2015 |
| EP | 2 892 031 A1 | 7/2015 |
| WO | WO-2012140105 A1 * 10/2012 | ............ G06Q 10/08 |

* cited by examiner

SETUP OF A COMMUNICATION LINK TO A USER APPARATUS VIA AN ACCESS CONTROL APPARATUS

CROSS-REFERENCE TO RELATED PATENT APPLICATION

This patent application claims priority to German Application No. 10 2015 111 711.8, filed Jul. 20, 2015, the entire teachings and disclosure of which are incorporated herein by reference thereto.

FIELD OF INVENTION

Exemplary embodiments of the invention relate to methods for setting up a communication link to a first user apparatus via an access control apparatus and/or for compiling and/or generating relevant authorization information by means of a server, and to an access control apparatus and a server, computer programs and a system comprising the access control apparatus and the server.

BACKGROUND OF INVENTION

Access control apparatuses are used in various respects, for example to control the access of persons to rooms in a building, as is the case in hotels, office complexes or laboratories, for example, to events or even, in an abstract form, to functions, resources or services, for example of computer functions or computer resources or server services.

One specific application of access control apparatuses is also formed by control of the access of the persons to a space and/or to openings of containers, such as e.g. safety deposit boxes or goods delivery containers, particularly of parcel boxes. Parcel boxes allow a novel form of delivery/pickup of parcels for persons who wish to receive or send parcels at or in proximity to their residence even in their absence. To this end, parcel boxes are usually installed in front of the residence of the parcel box user—in a similar manner to a mail box, but with a greater receiving volume—and parcels are then delivered or picked up by the delivery agent by placing them into the parcel box or removing them from the parcel box. In order to prevent misuse and theft, the parcel box needs to have a lock. Both the delivery agent and the parcel box user then need to be equipped with physical or electronic keys in order to be able to use the parcel box. To this end, digital keys may, by way of example, be stored as data records on what are known as tokens, for example on mobile telephones or RFID tags, which can therefore act as electronic keys. In some cases, a delivery or pickup may not readily be possible, however, despite an available, valid key for the parcel box. By way of example, the parcel may be too large for the parcel box, or, although the parcel box is in the open air, it is installed on demarcated grounds behind a locked gate. In such a case, the delivery agent has no other option than to await the shipment recipient in order to hand over the shipment in person or to abort the delivery and attempt to make it again at a later time.

BRIEF SUMMARY OF SOME EXEMPLARY EMBODIMENTS OF THE INVENTION

The present invention is therefore based, inter alia, on the object of overcoming these problems.

According to a first aspect of the invention, a method, performed by an access control apparatus, is disclosed that comprises the following:

obtaining a request to set up a communication link, wherein the request contains authorization information;

checking the authorization of the request to set up a communication link at least in part on the basis of the authorization information; and causing setup of and/or setting up a communication link to a first user apparatus only if the result of the checking is that the request to set up a communication link is authorized.

According to the first aspect of the invention, an access control apparatus is further disclosed that comprises the following:

means configured to perform the method according to the first aspect of the invention or comprising respective means for performing the steps of the method according to the first aspect of the invention.

In this case, either all steps of the method can be controlled by the means, or all steps of the method can be performed by the means, or one or more steps can be controlled by the means and one or more steps performed by the means. Different steps can optionally be performed or controlled by different means. By way of example, the access control apparatus corresponds to the access control apparatus in the method. The means can comprise hardware and/or software components. By way of example, the means can comprise at least one memory having program instructions of a computer program (e.g. of the computer program according to the first aspect of a invention) and at least one processor designed to execute program instructions from the at least one memory.

According to the first aspect of the invention, a computer program is further disclosed that comprises program instructions that are designed, when executed by at least one processor, to cause an apparatus to perform the method according to the first aspect.

According to a second aspect of the invention, a method, performed by a server, is disclosed that comprises the following:

obtaining a request to compile and/or generate authorization information that authorizes setup of a communication link via an access control apparatus;

compiling and/or generating the authorization information, wherein the authorization information allows the access control apparatus to check the authorization to set up the communication link, and wherein the authorization information is based at least in part on the obtained request; and causing communication of and/or communicating the authorization information to a second user apparatus in order to authorize the second user apparatus to request setup of a communication link via the access control apparatus.

According to the second aspect of the invention, a server is further disclosed that comprises the following:

means configured to perform the method according to the second aspect of the invention or comprising respective means for performing the steps of the method according to the second aspect of the invention.

In this case, either all steps of the method can be controlled by the means, or all steps of the method can be performed by the means, or one or more steps can be controlled by the means and one or more steps performed by the means. Different steps can optionally be performed or controlled by different means. By way of example, the server corresponds to the server in the method. The means can comprise hardware and/or software components. By way of example, the means can comprise at least one memory having program instructions of a computer program (e.g. of the computer program according to the second aspect of the invention) and at least one processor designed to execute program instructions from the at least one memory.

According to the second aspect of the invention, a computer program is further disclosed that comprises program instructions that are designed, when executed by at least one processor, to cause an apparatus to perform the method according to the second aspect.

Further, in accordance with the invention, a system is disclosed that comprises the following:
- an access control apparatus according to the first aspect of the invention; and
- an apparatus according to the second aspect of the invention.

The text below describes—in part by way of example—the properties of the methods according to the first and second aspects of the invention, of the access control apparatus according to the first aspect of the invention, of the server according to the second aspect of the invention, of the computer programs according to the first and second aspects of the invention and of the system according to the invention.

The processors can be understood to mean, in each case inter alia, control units, microprocessors, microcontrol units, such as microcontrollers, digital signal processors (DSP), application-specific integrated circuits (ASICs) or field programmable gate arrays (FPGAs). By way of example, each of the computer programs may be distributable via a network such as the Internet, a telephone or mobile radio network and/or a local area network. Each of the computer programs may at least in part be software and/or firmware of a processor. By way of example, each of the computer programs may be stored on a respective computer-readable storage medium, e.g. a magnetic, electrical, electromagnetic, optical and/or other kind of storage medium. By way of example, the storage medium may be part of a processor, for example a (nonvolatile or volatile) program memory of the processor or a part thereof; alternatively, it may be a component that is separate from the processor.

Particular exemplary embodiments according to the first aspect of the invention thus provide for an access control apparatus to be used not just for controlling access to a space. On the contrary, the method and the access control apparatus according to the first aspect of the invention are also used, by way of example, to allow setup of a communication link to the first user apparatus via the access control apparatus. Further, the method and the access control apparatus according to the first aspect of the invention allow, by way of example, the authorization to set up the communication link to be checked on the basis of authorization information and hence use of the communication link to be controlled.

By way of example, the request to set up a communication link is obtained by capturing a user input on user input means of the access control apparatus. By way of example, such user input means may be one or more keys, a keyboard (e.g. alphanumeric keyboard or a numeric keyboard such as a keypad), a touch-sensitive screen (e.g. a touch display), a microphone and/or a camera. By way of example, the access control apparatus comprises corresponding user input means.

Alternatively or additionally, the request to set up a communication link can be obtained by receiving the request by means of communication means of the access control apparatus. By way of example, the request has been communicated from a second user apparatus to the access control apparatus. By way of example, the communication means of the access control apparatus are configured to communicate with one or more apparatuses (e.g. the first and/or the second user apparatus and/or the server according to the second aspect of the invention) and to send and/or receive messages. By way of example, the request is part of one or more messages received by the communication means.

An example of such communication means is a communication interface. By way of example, the communication means of the control apparatus according to the invention comprise a communication interface for a wireless and/or wired communication technique.

An example of a wireless communication technique is a local radio network technique such as radio frequency identification (RFID) and/or near field communication (NFC) and/or Bluetooth (e.g. Bluetooth Version 2.1 and/or 4.0) and/or wireless local area network (WLAN). By way of example, RFID and NFC- are specified in accordance with ISO standards 18000, 11784/11785 and ISO/IEC standard 14443-A and 15693. The Bluetooth specifications are currently available on the Internet at www[dot]Bluetooth[dot]org. By way of example, WLAN is specified in the standards of the IEEE-802.11 family. A further example of a wireless communication technique is a transregional radio network technique such as, by way of example, a mobile radio technique, for example Global System for Mobile Communications (GSM) and/or Universal Mobile Telecommunications System (UMTS) and/or Long Term Evolution (LTE). The GSM, UMTS and LTE specifications are looked after and developed by the $3^{rd}$ Generation Partnership Project (3GPP) and are currently available on the Internet at www[dot]3gpp[dot]com, inter alia.

An example of a wired communication technique is Ethernet, USB (Universal Serial Bus), Firewire, UART (Universal Asynchronous Receiver Transmitter), such as RS-232, SPI (Serial Peripheral Interface), I2C (Inter-Integrated Circuit) and/or Power over Ethernet (PoE). The USB specifications are currently available on the Internet at www[dot]usb[dot]org. By way of example, PoE is specified in IEEE standard 802.3af-2003. Later and future versions of this and other standards are also to be understood by the term PoE, however.

For example, the access control apparatus comprises corresponding communication means.

A communication between the access control apparatus and the second user apparatus can be initiated in different ways. As such, there may be provision, by way of example, for the second user apparatus to transmit a contact request to the access control apparatus, which can then accept said contact request. Such a contact request can be transmitted in response to a user action or another trigger, for example. Alternatively, the access control apparatus could transmit a signal constantly, for example. When Bluetooth is used, such a signal could be an ever identical Bluetooth or Bluetooth Low Energy signal, for example. The second user apparatus receives the signal as soon as said signal comes into a range of the communication means of the access control apparatus, and can then react to reception of this signal.

The request obtained in accordance with the first aspect contains authorization information. The authorization information contains one or more authorization data and/or parameters, for example. These may be, by way of example, an (in particular univocal) identifier for the access control apparatus, an (in particular univocal) identifier for the authorization information itself, temporal validity information (e.g. in the form of a "Not before date", a "Not after date", a "Start time for the day" and an "End time for the day", which indicate within which days and within which time of day a communication link can be setup, for example from 27.3.2014 00:00:00 hours to 28.3.2014 23:59:59 hours) and/or an upper limit for the permitted uses of the authorization information in order to set up a communication link.

Furthermore, the request obtained according to the first aspect can comprise further information, such as command information (e.g. command data and/or parameters) for setting up a communication link, for example. As a result, the access control apparatus can recognize, by way of example, that the request is intended to cause setup of a communication link via the access control apparatus (and no other action, such as e.g. granting access). By way of example, this is advantageous in order to be able to use the same authorization information for checking the authorization for access and for checking the authorization to set up a communication link.

By way of example, the request to set up a communication link is a request that is intended to be used to cause the access control apparatus to set up a communication link to the first user apparatus, for example in order to allow a communication by a user who in the surroundings of the access control apparatus and a remote user. It goes without saying that the first user apparatus does not need to be specified in the request. On the contrary, the request to set up a communication link to a first user apparatus is also intended to include requests that comprise no details pertaining to the first user apparatus (e.g. comprise just the authorization information disclosed above and, if need be, the command information, likewise disclosed above, for setting up a communication link). Alternatively, it is also possible for the first user apparatus to be specified in the request, however.

According to the first aspect of the invention, the access control apparatus checks the authorization to set up a communication link at least in part on the basis of the authorization information. If the authorization information contains one or more authorization data and/or parameters, then a check is performed to determine whether at least one predefined set (e.g. all, or just some) of these data and/or parameters for respective reference information (e.g. respective reference data and/or reference parameters stored in a memory of the access control apparatus) authorize setup of a communication link.

By way of example, the identifier for the access control apparatus as an authorization parameter can be checked in respect of an identifier of the access control apparatus that is stored in the access control apparatus, and, in the event of a match, it can be established that this authorization parameter authorizes setup of a communication link. This is advantageous, for example, if the access control apparatus is an access control apparatus from a multiplicity of access control apparatuses, in order to ensure that the authorization information authorizes only setup of a communication link via an access control apparatus having the corresponding identifier.

By way of example, a piece of temporal validity information as an authorization parameter can be compared with the current time of day on a clock of the access control apparatus and, if the current time of day is within the temporal validity information, it can be established that this authorization parameter authorizes set up of a communication link. This is advantageous in order to limit the temporal validity of the authorization information, for example.

According to the first aspect, by way of example, the communication link is set up by the access control apparatus, and/or setup of the communication link is caused by the access control apparatus, only if it has been established for at least one particular set of the authorization parameters and/or data that, with regard to its respective reference information in the control apparatus, it authorizes setup of a communication link.

By way of example, the communication link is a voice link (e.g. a telephone connection and/or a Voice over Internet Protocol connection, VOIP connection), a video link (e.g. a video telephony connection) and/or a text message link (e.g. a chat and/or instant messaging connection). By way of example, the communication link comprises a connection via a transregional network such as a telephone network, a mobile radio network (e.g. a GSM, UMTS and/or LTE network) and/or the Internet.

By way of example, setup of a communication link to the first user apparatus via the access control apparatus is intended to be understood to mean that the access control apparatus initiates setup of a communication link between the access control apparatus and the first user apparatus. By way of example, the access control apparatus causing setup of a communication link to the first user apparatus is intended to be understood to mean that the access control apparatus communicates a piece of command information (e.g. command data and/or parameters) to a communication apparatus (e.g. a server such as the server according to the second aspect of the invention and/or the first user apparatus) that causes the communication apparatus to initiate setup of a communication link to the first user apparatus. In this case, initiation of setup of a communication link is intended to be understood to mean that setup of the communication link is started, for example. In order to initiate setup of a telephone and/or mobile radio connection to the first user apparatus, the telephone number of the first user apparatus is communicated to an exchange (e.g. a landline exchange and/or a mobile switching center), for example.

As disclosed above, the access control apparatus comprises appropriately configured communication means, for example, such as a communication interface.

By way of example, exemplary embodiments of the second aspect of the invention relate to compilation of the authorization information and communication of the authorization information to the second user apparatus. The server according to the second aspect of the invention is a key server and/or an authorization management server, for example.

The request to compile and/or generate authorization information, which request is obtained by the server according to the second aspect of the invention, is obtained on the server by virtue of communication means of the server receiving the request, for example. The communication means of the server are configured to communicate with one or more apparatuses (e.g. the first and/or the second user apparatus) and to send and/or receive messages, for example. The request is part of one or more messages received by the communication means, for example.

An example of such communication means is a communication interface. By way of example, the communication means of the server comprise a communication interface for a wireless and/or wired communication technique.

By way of example, the request to compile and/or generate authorization information contains command information (e.g. command data and/or parameters) that cause the server to compile and/or generate authorization information that allows the access control apparatus to check the authorization to set up the communication link.

By way of example, the authorization information generated and/or compiled by the server merely authorizes setup of a communication link (e.g. a communication link to a particular user apparatus such as the first user apparatus) via a particular access control apparatus.

The server compiles the authorization information at least in part on the basis of the obtained request and/or generates it at least in part on the basis thereof. By way of example, the request contains information pertaining to the compilation and/or generation of the authorization information such as an (in particular univocal) identifier of the access control apparatus and/or time information that indicates a time and/or period at/in which setup of the communication link will probably be requested via the access control apparatus.

In the present case, causing communication of the compiled authorization information to the second user apparatus according to the second aspect of the invention is intended to be understood, by way of example, to mean that the access control apparatus communicates the compiled authorization information and/or a piece of command information (e.g. command data and/or parameters) to a further apparatus in order to cause the further apparatus to communicate the compiled authorization information to the second apparatus. Alternatively or additionally, the server can communicate the compiled authorization information to the second user apparatus (in particular directly).

Accordingly, the compiled authorization information can be communicated from the server to the second user apparatus according to the second aspect of the invention directly or indirectly, that is to say via at least one further apparatus, for example. By way of example, the compiled information can be communicated to the second user apparatus, for example by being transmitted via a network to another server (e.g. a provision server) and/or computer that then transmits the information by wire (e.g. via a docking station) or wirelessly to the second user apparatus, or by being stored on the second user apparatus, or by being communicated via a secure connection, for example, to a piece of software ("App") on the second user apparatus, particularly a mobile telephone (e.g. a Smartphone), and being stored thereon.

Further advantages of the disclosed invention are described below on the basis of exemplary embodiments of the methods according to the first and second aspects of the invention, the access control apparatus according to the first aspect of the invention, the server according to the second aspect of the invention, the computer programs according to the first and second aspects of the invention and the system according to the invention, the disclosure of which is intended to be valid for the respective categories (method, apparatus, system, computer program) in equal measure.

In one exemplary embodiment of the invention, the authorization information is at least in part encrypted, for example the authorization information contains one or more authorization parameters that are at least in part encrypted.

By way of example, the authorization information may be at least in part encrypted using a symmetric encryption method. Alternatively or additionally, the authorization information may be at least in part encrypted using an asymmetric encryption method.

For example, the authorization information that is at least in part encrypted is compiled by the server according to the second aspect of the invention. By way of example, the server encrypts the authorization information at least in part when compiling and/or generating the authorization information. In this case, the server uses a first key from an (e.g. asymmetric) key pair, for example.

The access control apparatus checking the authorization of the request according to the first aspect of the invention accordingly comprises the following, for example:
  decrypting the encrypted authorization information; and
  comparing the decrypted authorization information with unencrypted information, wherein the unencrypted information is likewise contained in the authorization information, derived from contained information and/or stored in the access control apparatus.

If the server, according to the second aspect of the invention, uses a first key from an (e.g. asymmetric) key pair to encrypt the authorization information at least in part, then the access control apparatus uses a second key from the key pair to decrypt the encrypted authorization information, for example.

Further, the request to set up a communication link according to the first aspect of the invention can contain a piece of checking information. By way of example, the checking information is a digital signature. For example, the digital signature is generated as a signature for the authorization information or information contained therein (e.g. one or more authorization parameters and/or data). For example, the digital signature is generated by the server according to the second aspect of the invention when compiling and/or generating the authorization information and communicated to the second user apparatus together with the authorization information. Accordingly, checking the authorization of the request according to the first aspect of the invention can comprise a check on the digital signature. By way of example, the server can use a first key for generating the digital signature and the access control apparatus can use a second key from a key pair for checking the digital signature.

Both when using an encryption and when using a digital signature, the key pair may be an asymmetric key pair. For an encryption of data, the first key may be a public key and the second key may be a private key from an asymmetric key pair, for example; for a digital signature, the association of the keys may be the reverse. In both cases, the first key may be available exclusively to the server according to the second aspect of the invention, and the second key may, in both cases, be available exclusively to the access control apparatus according to the first aspect of the invention. By way of example, an asymmetric key pair may have been generated using the RSA algorithm. Alternatively, the key pair may be a symmetric key pair. In that case, the symmetric key pair comprises the same key twice, for example an AES key. The key may be available exclusively to the server and the access control apparatus. Both an asymmetric key pair and a symmetric key pair allow the information that is encrypted or signed to be encrypted or signed directly. Instead, the server could, when compiling and/or generating the authorization information according to the second aspect of the invention, also first of all form a hash value by means of the information or some of the information, and then encrypt or sign the hash value using the first key in order to obtain a piece of checking information. When checking the authorization of the request according to the first aspect of the invention, the access control apparatus can then first of all use the same algorithm to form a hash value by means of the relevant information. In the case of an encryption, if the pieces of original information and the hash values match, it can be assumed that the information obtained at the access control apparatus (e.g. all or some of the authorization information) is integral (intact) and that said information has been compiled by an authorized, trustworthy server. In the case of a signature, if the validity of the signature is confirmed, then it can be assumed that the information obtained at the access control apparatus (e.g. all or some of the authorization information) is integral and that it has been compiled by the trustworthy server.

In one exemplary embodiment of the first aspect of the invention, the method further comprises holding one or more pieces of contact information, wherein the contact information comprises details for contacting the first user apparatus. For example, the contact information is stored in a memory of the access control apparatus.

In the present case, contact information is intended to be understood to mean a univocal identifier for the first user apparatus and/or for a user of the first user apparatus (e.g. in a communication network and/or a communication server), for example. An example of such contact information is a subscriber address, a telephone number, an email address, an SIP address (Session Initiation Protocol address, for example sip:userid[at]domain), a user name and/or a user number.

For example, the contact information is used when setting up the communication link to the first user apparatus, for example in order to contact and/or to identify the first user apparatus.

For example, the access control apparatus merely holds contact information for contacting the first user apparatus, so that there is no need for specification of the first user apparatus in the request to set up the communication link. It goes without saying that the access control apparatus can also hold contact information for contacting different user apparatuses, so that there may be a need for specification of the first user apparatus in the request to set up the communication link. Alternatively or additionally, there could in this case also be a predetermined order in which attempts are to be made to set up a communication link to the user apparatuses.

In one exemplary embodiment of the first aspect of the invention, the request is obtained at the access control apparatus from a second user apparatus and/or from a user of the second user apparatus. Further, the communication link is set up between the first user apparatus and the second user apparatus, for example.

By way of example, the second user apparatus is:
a portable electronic device (e.g. a "Tag" such as an RFID or NFC tag, for example a MiFARE DESFire from NXP) and/or
a portable electronic device of a delivery agent and/or
a hand-held scanner (for example the Dolphin 99EX Mobile Computer from the Honeywell company and/or
a mobile communication device (e.g. a mobile telephone such as a smartphone).

This has the effect that a user of the second user apparatus can use the access control apparatus to set up a communication link between the first and second user apparatuses. Accordingly, the user of the second user apparatus can use the second user apparatus to communicate with a user of the first user apparatus, for example without the user of the second user apparatus and/or the second user apparatus having and/or obtaining access to contact information for contacting the first user apparatus.

By way of example, this is advantageous in order to allow a communication between a delivery agent and a shipment recipient when the shipment is too large for a receiving unit (e.g. a parcel box) controlled by the access control apparatus and the shipment recipient is not situated at the delivery location. In this case, the shipment recipient and the delivery agent can use the communication link, for example, to communicate in order to arrange an alternative delivery location and/or time. By way of example, a shipment is a packaged item, a piece good, a parcel shipment (e.g. a parcel) and/or a mail shipment (e.g. a letter).

For example, the access control apparatus and the second user apparatus communicate exclusively via a (or multiple) local connection(s). By way of example, a local connection of this kind is a (e.g. wireless) connection using a local radio network technique and/or a connection via a wireless local area network, for example a local connection of this kind is a Bluetooth and/or WLAN connection. By way of example, this has the effect that the second user apparatus can request and use the communication link only if it is within the range of the local radio network technique and/or the wireless local area network around the access control apparatus. As a result, use of the communication link can be limited to second user apparatuses that are situated in the surroundings of the access control apparatus.

By way of example, the communication link according to the first aspect of the invention comprises a (e.g. wireless) connection via a transregional communication network between the first user apparatus and the second user apparatus. As disclosed above, a connection via a transregional communication network is a telephone network, a mobile radio network (e.g. a GSM, UMTS and/or LTE network) and/or the Internet, for example. This has the effect that the first user apparatus and the second user apparatus can communicate with one another directly and over a great distance, for example.

For example, causing setup of the communication link to the first user apparatus according to the first aspect of the invention comprises communicating to the first user apparatus a request to set up a communication link to the second user apparatus. For example, the request obtained according to the first aspect of the invention at the access control apparatus comprises not only the authorization information but also contact information for contacting the second user apparatus. The request communicated in the first apparatus to set up a communication link to the second user apparatus could contain this contact information in order to render the first user apparatus able to set up the communication link between the first user apparatus and the second user apparatus. When setting up the communication link to the second user apparatus, the first user apparatus could suppress communication of contact information to the second user apparatus, for example.

In one exemplary embodiment of the first aspect of the invention, the communication link comprises a connection via a transregional communication network between the access control apparatus and the first user apparatus. As disclosed above, a connection via a transregional communication network is a telephone network, a mobile radio network (e.g. a GSM, UMTS and/or LTE network) and/or the Internet, for example. This has the effect that the first user apparatus and the access control apparatus can communicate with one another directly and over a great distance, for example.

For example, the access control apparatus comprises user input and user output means in order to allow a user of the access control apparatus to use the connection via the transregional communication network between the access control apparatus and the first user apparatus to communicate with a user of the first user apparatus. In this example, the communication link comprises exclusively a connection via the transregional communication network between the access control apparatus and the first user apparatus, for example.

Alternatively or additionally, the communication link can comprise a local connection between the access control apparatus and the second user apparatus. As disclosed above, a local connection of this kind is, by way of example, a (e.g. wireless) connection using a local radio network technique and/or a connection via a wireless local area network, for example a local connection of this kind is a Bluetooth and/or WLAN connection. By way of example, this has the advantage that the access control apparatus does not have to comprise a dedicated user input and user output means in order to allow a user of the second user apparatus to communicate with a user of the first user apparatus. In this example, the access control apparatus is used as an exchange (e.g. as a gateway) between the connection via the transregional network to the first user apparatus and the local connection to the second user apparatus, for example.

In one exemplary embodiment of the invention, the access control apparatus is fitted at a fixed location, fitted in or to a parcel box, part of a locking system of a parcel box, fitted in or to a parcel butler, part of a locking system of a parcel butler, part of a receiving unit for receiving a shipment and/or controls access to a receiving unit for receiving a shipment. Besides a parcel box such a receiving unit may also be any other unit suitable for receiving a shipment. For example, a vehicle is also a unit suitable for receiving a shipment. By way of example, the access control apparatus controls access to an interior of the vehicle in this example.

For example, the access control apparatus can also control access to an interior of a vehicle.

Accordingly, the method according to the first aspect of the invention further comprises:

obtaining a request to grant access to a space, wherein the request likewise contains the authorization information (or other authorization information);

checking the authorization of the request to grant access to a space at least in part on the basis of the authorization information (or the other authorization information); and causing granting of access and/or granting access to the space only if the result of the checking is that the request to grant access to the space is authorized.

By way of example, the space is a receiving compartment for receiving a shipment, for example a receiving compartment of a receiving unit such as a parcel box or a parcel butler.

By way of example, obtaining the request to grant access to a space and checking the authorization of the request to grant access to a space correspond to obtaining a request to set up a communication link and checking the authorization of the request to set up a communication link. For example, the request to grant access to a space and the request to set up a communication link differ only by virtue of command information contained therein that indicates whether access to a space needs to be granted or whether a communication link needs to be set up, for example. Accordingly, the disclosures pertaining to obtaining a request to set up a communication link and to checking the authorization of the request to set up a communication link are accordingly also intended to apply to obtaining the request to grant access to a space and checking the authorization of the request to grant access to a space.

By way of example, causing granting of access and/or granting access to the space is intended to be understood to mean that the access control apparatus actuates a locking mechanism of a door that closes the space in order to cause the locking mechanism to unlock and/or to open the door. By way of example, the access control apparatus comprises actuating means that are configured to actuate a locking mechanism of a door as appropriate. An example of such a locking mechanism is an electronically actuable door lock.

In one exemplary embodiment of the invention, the first user apparatus is a portable electronic device (e.g. a media player such as an iPod, a computer such as a desktop computer, a laptop computer and/or a tablet computer), a portable electronic device of a shipment recipient, a hand-held scanner and/or a mobile communication device (e.g. a mobile telephone such as a smartphone).

Further advantageous exemplary refinements of the invention can be found in the detailed description that follows for a few exemplary embodiments of the present invention, particularly in conjunction with the figures. The figures accompanying the application are intended to be used only for the purpose of clarification, however, rather than for determining the scope of protection of the invention. The accompanying drawings are not necessarily to scale and are intended merely to reflect the general concept of the present invention by way of example. In particular, features included in the figures are in no way intended to be regarded as a necessary part of the present invention.

DETAILED DESCRIPTION OF THE INVENTION

Figure 1:
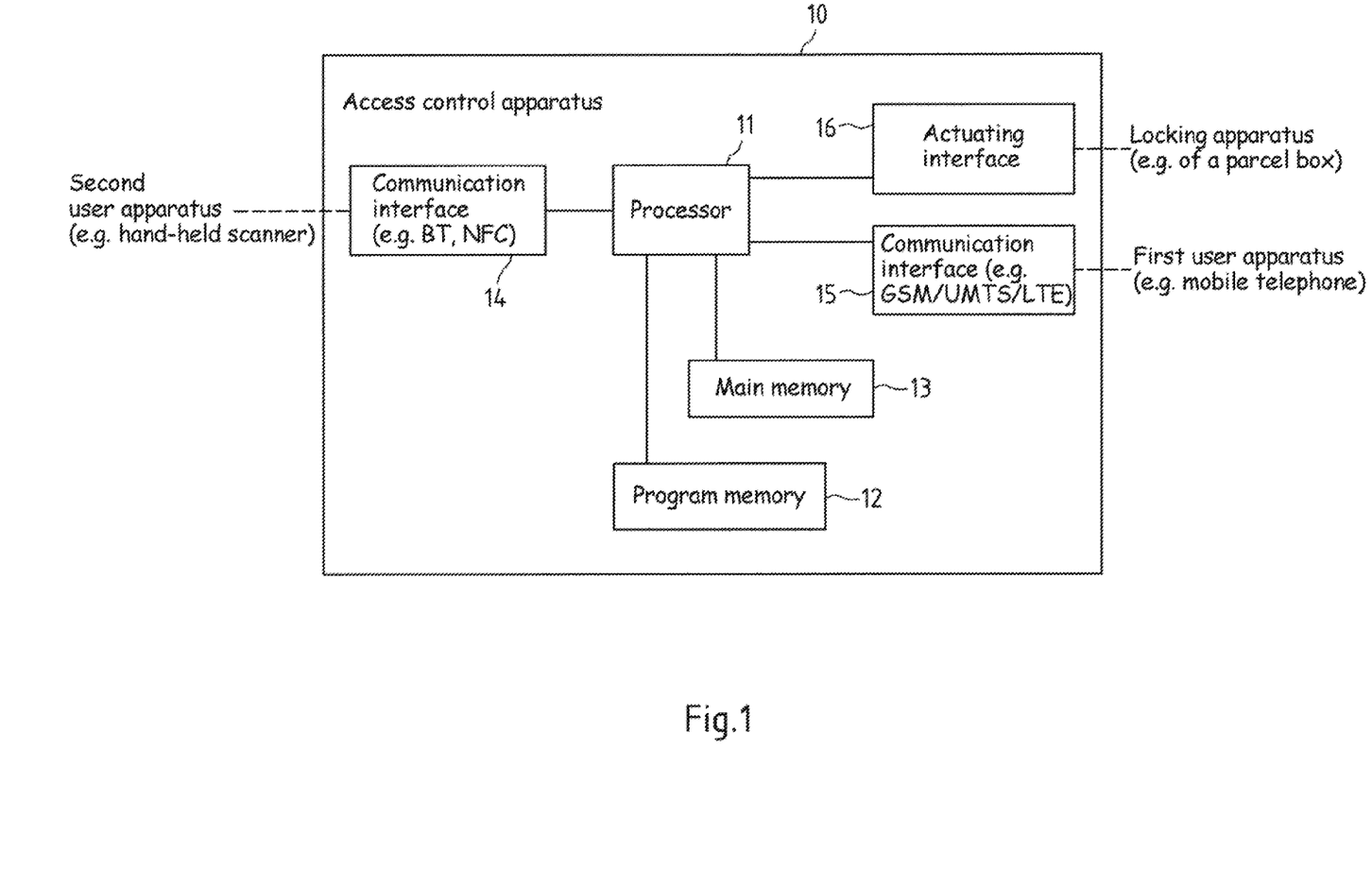
FIG. 1 shows a schematic illustration of an embodiment of an access control apparatus according to the first aspect of the invention.

FIG. 1 is a schematic illustration of an exemplary embodiment of an access control apparatus 10 according to the first aspect of the invention.

By way of example, the access control apparatus 10 comprises a processor 11 and, connected to the processor 11, a first memory as a program and data memory 12, a second memory as a main memory 13, a first communication interface 14, a second communication interface 15 and an actuating interface 16. It goes without saying that for the same and/or additional tasks, a processor 11 may also be replaced by multiple processors, each memory 12, 13 may also be replaced by multiple memories and an actuating interface 16 may also be replaced by multiple actuating interfaces.

By way of example, the processor 11 may be a microprocessor that also comprises a clock.

By way of example, the memory 12 may be a read only memory (ROM) that permits only read access. This allows the apparatus 10 to be protected against manipulations. The memory 12 stores program instructions from at least one computer program. The computer program may be an exemplary computer program according to the first aspect of the invention, and memory 12 may be an exemplary storage medium according to the first aspect of the invention. By way of example, an apparatus—e.g. the access control apparatus 10 or an apparatus (e.g. a parcel box) that contains the access control apparatus 10—is caused to perform the method according to the first aspect of the invention and/or the steps of the method according to the first aspect of the invention (e.g. steps 506 to 508 of the flowchart 500 shown in FIG. 5) when the processor 11 executes the program instructions stored in memory 12. Besides program instructions, the program memory may also store values of different parameters, such as an MAC address associated with the access control apparatus 10 and/or another identifier (e.g. identification number of the locking system LockID) of the access control apparatus 10 or a key S2 for decrypting obtained messages or for verifying digital signatures. Such parameter values may alternatively also be stored in an additional nonvolatile random access memory (RAM), not shown, however. This could then additionally store variable parameters that are not yet known when the apparatus 10 is produced, such as a password for a WLAN. As a further alternative, memory 12 may also itself be in the form of a nonvolatile random access memory, however. This allows or facilitates updates for the program instructions, for example.

By way of example, the main memory 13 may be a volatile random access memory (RAM). This can store obtained data, currently used program instructions and interim results, for example, while they are needed.

By way of example, the first communication interface 14 may be an interface for a Bluetooth (BT) or NFC based communication. It is provided for a communication with a second user apparatus. The second user apparatus may be any portable electronic apparatus, for example a hand-held scanner of a delivery agent or a mobile telephone of a user. It goes without saying that the access control apparatus 10 can use this interface 14 to communicate with various second user apparatuses (e.g. hand-held scanners of delivery agents).

By way of example, the second communication interface 15 may be an interface for a communication via a GSM, UMTS and/or LTE mobile radio network. It is provided for a communication with a first user apparatus (e.g. a mobile telephone of the holder and/or owner of the access control apparatus 10).

By way of example, the actuating interface 16 may be an interface to at least one actuator that is controlled via the access control apparatus 10. By way of example, such an actuator may be an electronically controllable locking device, for example for a door of a parcel box. If the parcel box comprises multiple compartments, then the same actuating interface 16 or multiple actuating interfaces can be used to actuate a respective electronically controllable locking device for each door of each of the compartments.

The access control apparatus 10 can also contain further components. By way of example, the access control apparatus 10 could be a locking system that also contains an electronically controllable locking device, inter alia, or could be a storage apparatus, such as a parcel box, that comprises such a locking system and a space secured thereby. Alternatively, the access control apparatus 10 could also contain fewer components, for example just the processor 11 and the memories 12 and 13. By way of example, it could be a module for an access control system that additionally contains the interfaces 14, 15 and 16.

Figure 2:
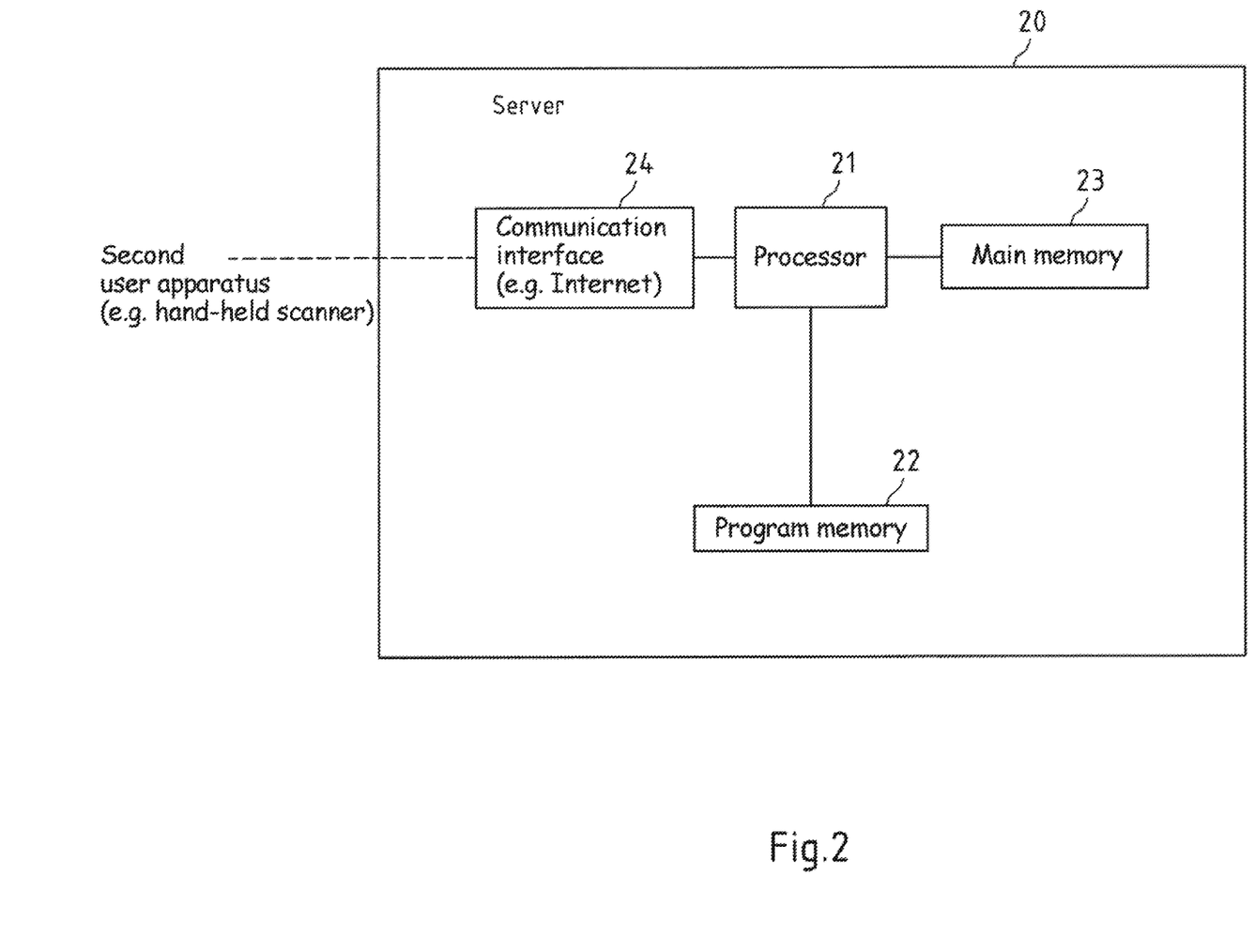
FIG. 2 shows a schematic illustration of an embodiment of a server according to the second aspect of the invention.

FIG. 2 is a schematic illustration of an exemplary embodiment of a server 20 according to the second aspect of the invention.

By way of example, the server 20 may be a key server and/or an authorization management server that provides a second user apparatus with an authorization to use an access control apparatus to request setup of a communication link.

By way of example, the server 20 comprises a processor 21 and, connected to the processor 21, a first memory 22 as a data and program memory, a second memory 23 as a main memory and a communication interface 24. It goes without saying that for the same and/or additional tasks, a processor 21 may also be replaced by multiple processors and each memory 22, 23 may also be replaced by multiple memories.

By way of example, the processor 21 may be a microprocessor and/or a digital signal processor.

By way of example, the memory 22 may be a nonvolatile random access memory. The program memory stores program instructions from at least one computer program. The computer program may be an exemplary computer program according to the second aspect of the invention, and memory 22 may be an exemplary storage medium according to the second aspect of the invention. By way of example, an apparatus—e.g. the server 20—is caused to perform the method according to the second aspect of the invention and/or the steps of the method according to the second aspect of the invention (e.g. steps 401 to 403 of the flowchart 400 shown in FIG. 4) when the processor 21 executes the program instructions stored in memory 22. Besides program instructions, the memory 22 may also store different data. By way of example, such data may comprise an association between different parameter values and different access control apparatuses 10. As such, a respective identifier (e.g. identification number of the locking system LockID) of an access control apparatus 10 could have an associated key S1 for encrypting and/or signing messages for the access control apparatus 10, an associated MAC address for the access control apparatus 10 and/or an associated street address for the access control apparatus 10, for example. Such data may alternatively be stored in an additional nonvolatile random access memory, not shown, however.

By way of example, the main memory 23 may in turn be a volatile random access memory that can be used to store obtained data, currently used program instructions and interim results while they are needed.

By way of example, the communication interface 24 may be a TCP/IP interface that allows direct or indirect communication with various other devices over the Internet, for example with portable electronic devices (e.g. the second user apparatus) and other servers.

The server 20 can contain any further components, such as a user interface for servicing tasks. Alternatively, the server 20 could also contain fewer components, for example just the processor 21 and the memories 22 and 23.

Figure 3:
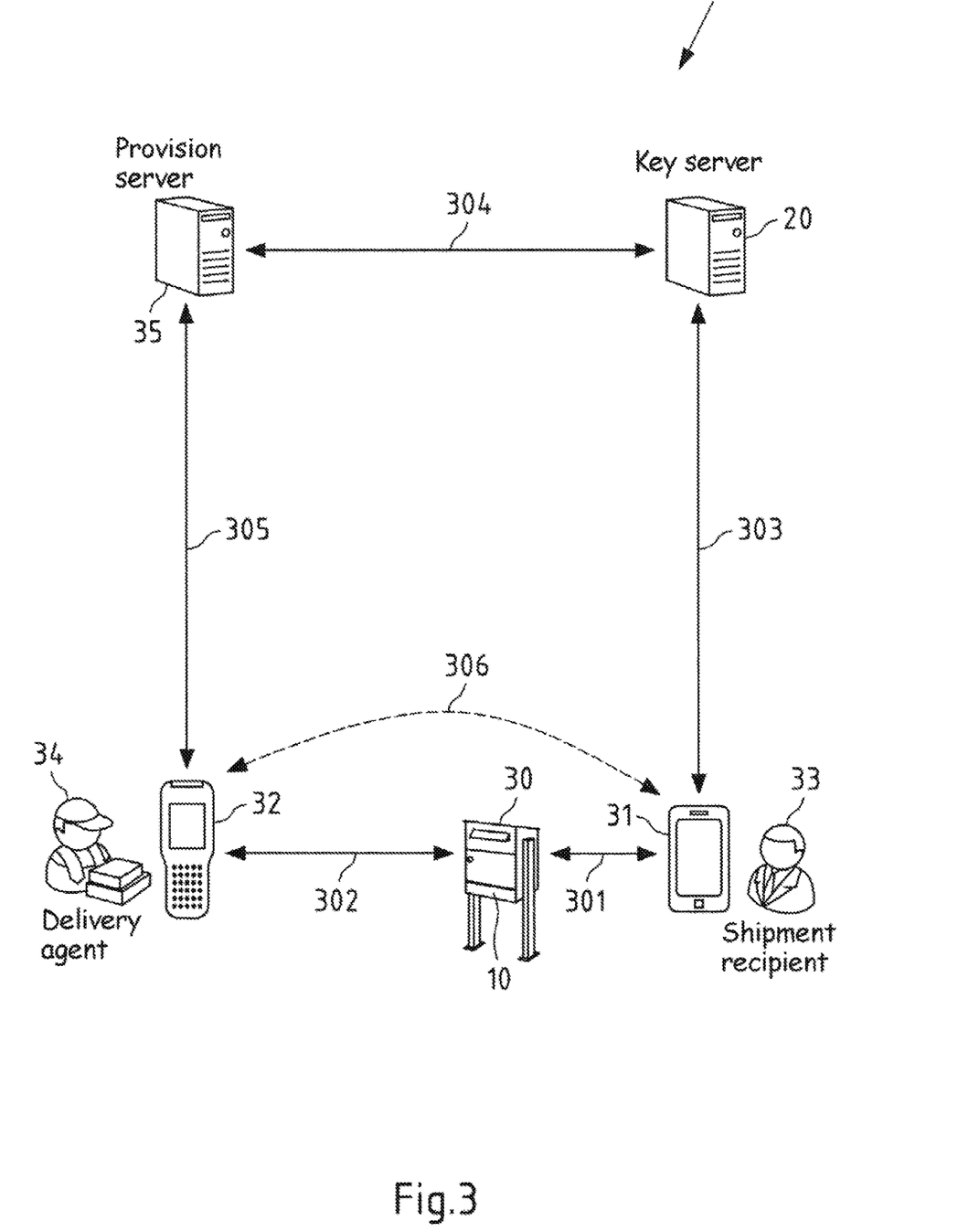
FIG. 3 shows a schematic illustration of an exemplary embodiment of a system according to the invention.

FIG. 3 is a schematic illustration of an exemplary embodiment of a system 3 according to the invention.

The system 3 comprises the access control apparatus 10 and the server 20, inter alia. In system 3, the access control apparatus 10 is shown as part of a fixed-location parcel box 30 by way of example. In addition, the server 20 in system 30 is a key server of a logistics and/or delivery service by way of example.

Besides the access control apparatus 10, the parcel box 30 comprises at least one locking system having a digital locking device, for example. The digital locking device can secure a door of the parcel box 30. By way of example, the parcel box 30 is a parcel box for a single-family house, comprising a single compartment having an associated locking system. Alternatively, it can also be a parcel box for an apartment building, however, and comprise a plurality of compartments secured by a respective locking device. In the latter case, all locking devices can belong to the same locking system and be controlled by the same access control apparatus (e.g. the access control apparatus 10); alternatively, a separate access control apparatus can be used for each locking device, so that there is a dedicated locking system for each compartment. Each locking device and/or the whole locking system is identified by a univocal identifier (LockID). The parcel box 30 may additionally comprise at least one mail box.

Optionally, the system 3 furthermore comprises a first user apparatus 31, which is shown as a mobile telephone by way of example, and a second user apparatus 32, which is shown as a hand-held scanner by way of example.

By way of example, the mobile telephone 31 is the mobile telephone of a shipment recipient 33 to whom the parcel box 30 belongs. The mobile telephone 31 may have an application stored that allows use and possibly configuration of the access control apparatus 10 and also possibly registration of the parcel box 30 with the logistics and/or delivery service. By way of example, the mobile telephone 31 may be configured to use connection 301 via a mobile radio network (e.g. a GSM, UMTS and/or LTE mobile radio network) to communicate with the access control apparatus 10 of the parcel box 30. It goes without saying that as an alternative or in addition to the connection 301, further connections (e.g. a WLAN connection) are possible between the mobile telephone 31 and the access control apparatus 10 of the parcel box 30.

For example, the hand-held scanner 32 is a hand-held scanner of a delivery agent 34 of a logistics and/or delivery service who has been tasked with delivering the shipment. For example the hand-held scanner 32 comprises a scanner for scanning ShipmentIDs or other codes on parcels or other mail shipments, at least one memory for storing current digital keys for various parcel boxes and for storing program instructions for causing the hand-held scanner 32 to perform different actions. By way of example, the hand-held scanner 32 may be configured to use a Bluetooth and/or NFC connection 302 to communicate with the access control apparatus 10 of the parcel box 30. It goes without saying that alternatively or in addition to the connection 302, further connections (e.g. a WLAN connection) are possible between the hand-held scanner 32 and the access control apparatus 10 of the parcel box 30.

Optionally, the mobile telephone 32 and the hand-held scanner 32 can communicate directly via a connection 306 via a mobile radio network (e.g. a GSM, UMTS and/or LTE mobile radio network).

By way of example, the key server 20 can use a connection 303 to communicate with the mobile telephone 31. Besides the key server 20, system 3 optionally comprises a provision server 35. The provision server 35 is configured to communicate—directly or indirectly—with the key server 20 (e.g. via connection 304) and with different delivery agent devices such as a the hand-held scanner 32 (e.g. via connection 305). It goes without saying that the functions of the provision server 35 could also be implemented in the key server 20. On the other hand, a key server 20 could also have an associated plurality of provision servers. In that case, the provision servers could optionally also be associated with different logistics and/or delivery services. By way of example, the connections 303, 304 and 305 are connections via the Internet. However, it is also conceivable for one or more of these connections to be via another (e.g. private) network and/or local connections.

It goes without saying that various further servers of the logistics and/or delivery service may furthermore be incorporated in the system 3.

Figure 4:
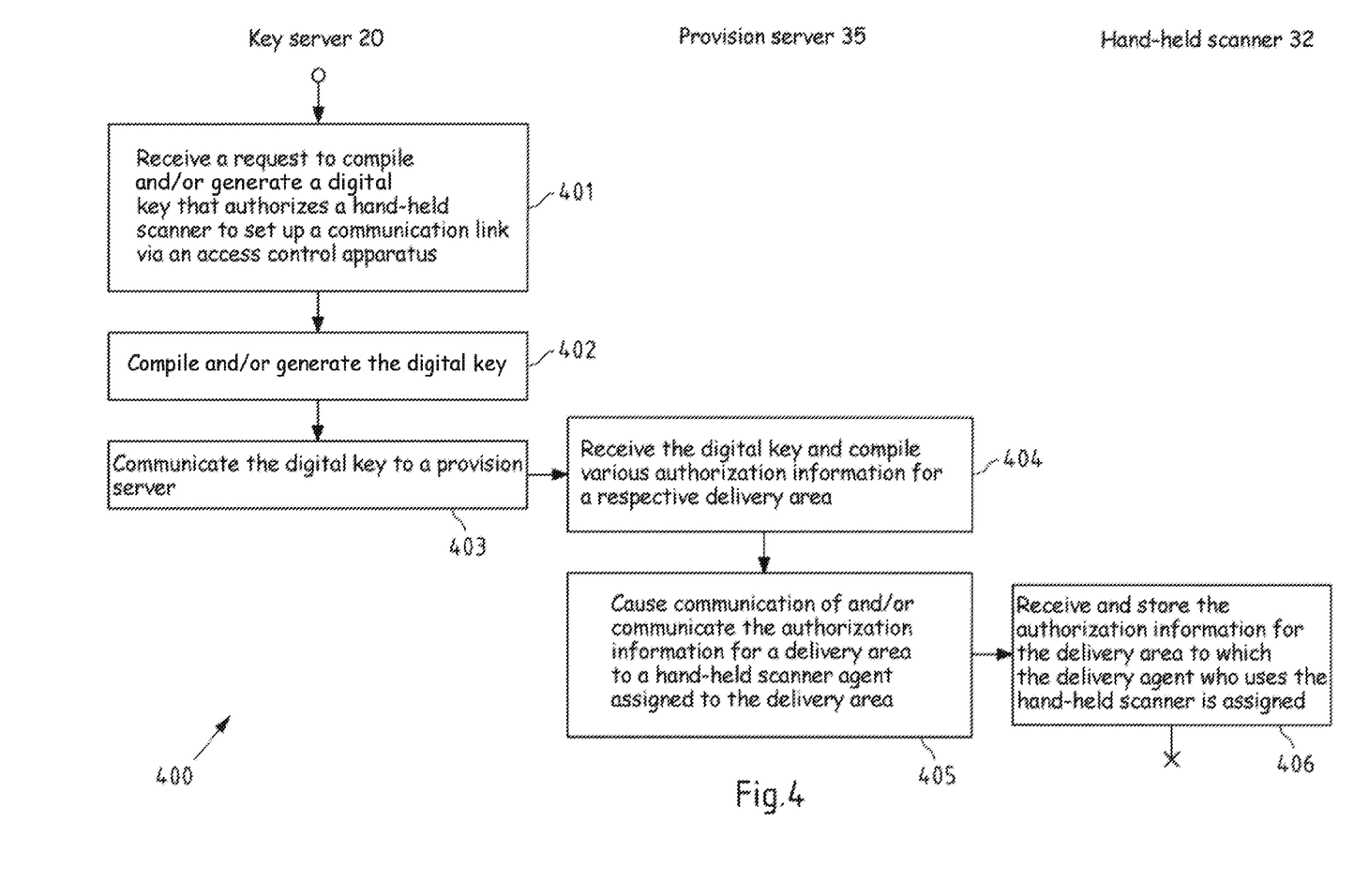
FIG. 4 shows a flowchart illustrating actions for an instance of provision of a digital key for a hand-held scanner of a delivery agent.
Figure 5:
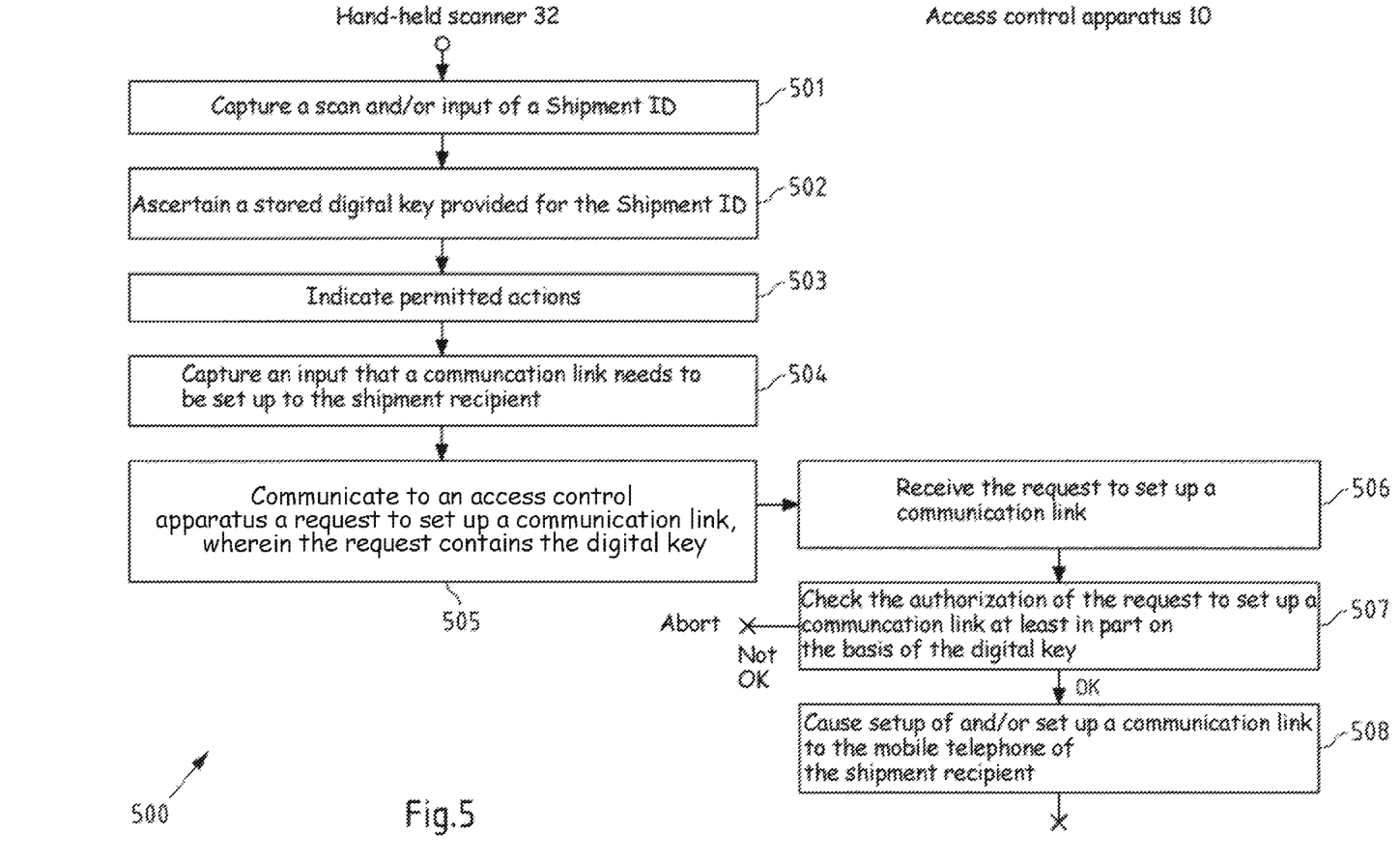
FIG. 5 shows a flowchart illustrating the requesting of setup of a communication link to a first user apparatus via an access control apparatus of the parcel box by means of a hand-held scanner using a suitable digital key.

The system permits the delivery agent 34, for example, to use the hand-held scanner 32 to set up a communication link to the mobile telephone 31 of the shipment recipient 33 via the access control apparatus 10 of the parcel box 30 without this requiring the delivery agent 34 to know the contact information for contacting the mobile telephone 31 (e.g. the telephone number of the mobile telephone 31). FIGS. 4 and 5 illustrate exemplary operations in the system 3 from FIG. 3.

FIG. 4 is a flowchart 400 that illustrates actions for an instance of provision of a digital key for a hand-held scanner 32 of a delivery agent. Steps 401 to 403 of the flowchart 400 are steps of an exemplary embodiment of the method according to the second aspect of the invention, for example.

The parcel box 30 allows a delivery agent to deliver or pick up a parcel even if the recipient is not at home. To this end, a hand-held scanner 32 of the delivery agent obtains and stores a digital key specifically for the parcel box 30 of the shipment recipient, for example. The digital key allows the delivery agent to open the parcel box 30. In this case, the validity of the digital key may be limited to the day of the delivery, for example. In some cases, a delivery or pickup may not readily be possible despite an available valid key for the parcel box 30, however. By way of example, the parcel may be too large for the parcel box 30, or, although the parcel box 30 is in the open air, it is installed on demarcated grounds behind a locked gate. In order to allow the delivery agent to make contact with the shipment recipient in such a case, the shipment recipient can use the mobile telephone 31 to store contact information in the access control apparatus 10 that can be used to set up a communication link to the mobile telephone 31 of the shipment recipient, for example. So that the delivery agent can use the access control apparatus 10 to set up this communication link, the delivery agent needs to authenticate himself to the access control apparatus using the digital key specifically for the parcel box 30 of the shipment recipient, for example. By way of example, the digital key authorizes the delivery agent both to open the parcel box 30 and to set up the communication link to the mobile telephone 31. Alternatively, different digital keys can also authorize opening of the parcel box 30 and setup of the communication link to the mobile telephone 31.

In a step 401, the key server receives a request to compile and/or generate a digital key that authorizes the hand-held scanner 32 to set up a communication link via the access control apparatus 10.

By way of example, the request contains an identification number for a locking device and/or for the locking system of the parcel box 30 as a univocal identifier for the access control apparatus 10. Such an identification number is subsequently referred to as LockID.

After that, in a step 402, the key server 20 compiles the digital key and/or generates it. The digital key contains authorization information and checking information and is possibly augmented by accompanying supplementary information.

For example, the authorization information can contain the LockID and various further authorization parameters that authorize the hand-held scanner 32 to set up a communication link via the access control apparatus 10. Additionally, the key server 20 can add authorization parameters to the authorization information that authorize another action— particularly opening the parcel box—associated with the LockID. Such authorization parameters can be stored in memory 22 of the key server 20 and, by way of example, read and compiled on the basis of the obtained LockID. It goes without saying that any other authorization parameters can also be added to the authorization information, such as a number of permitted uses of the generated digital key.

By way of example, the authorization information can contain one or more of the following authorization parameters:

LockID: ID of the locking device and/or of the locking system

NotBeforeDate: "valid from" date with year/month/day

NotAfterDate: "valid to" date with year/month/day

StartTimeOfDay: time of day from when the authorization information is valid (standard e.g. 00:00:00)

EndTimeOfDay: time of day until when the authorization is valid (standard e.g. 23:59:59)

MaxUses: number of uses; standard 0 means "unlimited"

Permissions: consent for security-critical operations on the locking system, consent for setup of a communication link via the access control apparatus.

In this case, the two parameters "NoteBeforeDate" and "NotAfterDate" define the validity period for the authorization, e.g. with the accuracy of one day. "NotBeforeDate" stipulates the date of first use and "NotAfterDate" stipulates the last day in the validity period. "StartTimeOfDay" further specifies the time of day from when the validity period begins, and "EndTimeOfDay" specifies when said validity period ends. By way of example, the accuracy is one second. The period of validity of the digital key can be stipulated as a predetermined period on the day scheduled for the delivery (for example for the entire day, that is to say between 0:00 hours and 23:59 hours, or for a period on the day, e.g. between 14:00 hours and 18:00 hours), for example. For example, the request contains relevant information pertaining to the scheduled delivery day and/or delivery period.

"MaxUses" defines how often the digital key can be used. In this case, the value "0" stipulates that the digital key can be used without limitation in the defined period, for example.

"Permissions" encodes, for example by setting individual bits in a byte, what security-critical operations a device having the digital key is permitted to perform (a bit set to '1' then indicates the presence of the authorization in each case), e.g. whether opening of a parcel compartment or whether opening of a parcel compartment and a mail compartment is permitted in each case and whether setup of a communication link via the access control apparatus is permitted. If the shipment recipient (e.g. up to a stipulated time before the delivery and/or pickup) has not approved setup of a communication link via the access control apparatus 10, the authorization information comprises only an authorization parameter that permits opening of a parcel compartment or opening of a parcel compartment and a mail compartment of the parcel box 30 (but not setup of a communication link via the access control apparatus), for example.

The checking information allow the authorization information and hence the authorization per se to be checked. By way of example, it may be authorization information encrypted using a key S1 stored on the key server 20 or may be a signature, generated using a key S1 stored on the key server 20, concerning the authorization information. For example, the key S1 may be a key from a symmetric key pair or a key from an asymmetric key pair. Memory 22 of the key server 20 may store, for a multiplicity of locking systems and/or locking devices, a respective dedicated key S1 with an association with the LockID of the respective locking system and/or of the locking device. The respective required key S1 can then be retrieved on the basis of the obtained LockID and used for generating the checking information. In the case of a symmetric key pair, the key S1 may be stored exclusively in the key server 20 and—as an identical key S2—in the access control apparatus 10 identified by the LockID. In the case of an encryption method with an asymmetric key pair, the public key S1 for encryption may be stored exclusively in the key server 20, while the corresponding private key S2 for decryption may be stored exclusively in the access control apparatus identified by the LockID. In the case of a signing method with an asymmetric key pair, the private key S1 for signing may be stored exclusively in the key server 20, while the corresponding public key S2 for checking the signature may be stored exclusively in the access control apparatus identified by the LockID.

It goes without saying that the digital key can also have any further information added as supplementary information, such as a ShipmentID for an expected package, a ShipmentID for a packet that is to be picked up, a street address associated with the LockID in memory 22 of the key server 20 and/or the MAC address of the access control apparatus 10, which is obtained or is read from the memory 22 of the key server 20.

The key server 20 can generate relevant digital keys for a multiplicity of users when a parcel needs to be delivered or picked up for the respective user.

In a step 403, the key server 20 communicates the digital key with the appended supplementary information to the provision server 35.

By way of example, the provision server 35 obtains a multiplicity of digital keys from the key server 20, for example via a secure Internet connection. For example, the provision server 35 stipulates delivery areas for a respective day, in which delivery agents are intended to deliver parcels. In a step 404, it then compiles the digital keys for each delivery area, which contain a LockID that identifies a locking system and/or a locking device in the delivery area. To this end, the provision server 35 can store an association between the LockIDs of the locking systems and/or locking devices of installed parcel boxes and street addresses in a memory and can evaluate said association for compiling the digital keys if the street addresses have not already been provided by the key server 20 together with the digital keys.

In a step 405, the provision server 35 communicates the digital keys compiled for a respective delivery area, together with the supplementary information that may have been appended for the digital keys by the key server 20, to the hand-held scanner 32 of a delivery agent who is assigned to the delivery area. Alternatively or in addition, the provision server 35 can cause a communication of this kind. The communication can take place in a variety of ways. By way of example, the communication can take place in a parcel center at which the delivery agent loads the parcels that are to be delivered. The communication can then take place via a local WLAN, for example. Alternatively, the communication could take place via a fixed-location computer by means of a cable connection or Bluetooth, or else via a docking station for the hand-held scanners. As a further alternative, the communication could also take place via a mobile radio network if the hand-held scanners are configured for a communication via the mobile radio network. The transmission may be additionally secured in each case, for example by means of an encryption that can be decrypted only by the respective provided hand-held scanner 32.

In a step 406, the hand-held scanner 32 receives the digital keys for a delivery area and stores them in an internal memory. If each key has a validity with a length of no more than one day, for example, then the stored digital keys can be automatically erased before new digital keys are read in or at a particular time of day in each case, for example.

It goes without saying that a digital key can, in certain situations, also be transmitted to more than one hand-held scanner 150, in order to allow more flexible handling in adjoining delivery areas.

FIG. 5 is a flowchart that shows the requesting of setup of a communication link to a first user apparatus via an access control apparatus 10 of the parcel box by means of a hand-held scanner 32 using a suitable digital key. By way of example, steps 506 to 508 of the flowchart 500 are steps of an exemplary embodiment of the method according to the first aspect of the invention.

As described above, the parcel box 30 allows a delivery agent to deliver or pick up a parcel even if the recipient is not at home. In some cases, a delivery or pickup may not readily be possible despite an available, valid key for the parcel box 30, however. By way of example, the parcel may be too large for the parcel box 30, or, although the parcel box 30 is in the open air, it is installed on demarcated grounds behind a locked gate. In order to allow the delivery agent to make contact with the shipment recipient in such a case, the shipment recipient can use the mobile telephone 31 to store contact information in the access control apparatus 10 that can be used to set up a communication link to the mobile telephone 31 of the shipment recipient, for example. It is subsequently assumed that corresponding contact information is stored in the memory 12 of the access control apparatus 10.

A delivery agent delivers parcels in an assigned delivery area and does so using the hand-held scanner 32. The hand-held scanner 32 stores the digital keys for the delivery area that have been compiled and/or generated for the current day.

A parcel is to be delivered to an address associated with the parcel box 30, but the compartment of the parcel box is too small to receive the parcel, for example.

In a step 501, the delivery agent scans a ShipmentID or a more comprehensive code on the parcel using the hand-held scanner 32. The ShipmentID is captured by the hand-held scanner 32 and provided for an application running on the hand-held scanner 32. In a step 502, the application subsequently takes the ShipmentID as a basis for ascertaining a digital key that is associated with the ShipmentID and stored on the hand-held scanner 32 and stored supplementary information that may be associated with the digital key.

In the authorization information, the digital key ascertained by the application contains a set bit in the "Permissions" parameter for opening a parcel box and a further set bit in the "Permissions" parameter for setting up a communication link via the access control apparatus, for example.

In a step 503, the hand-held scanner 32 indicates to the delivery agent the actions that are permitted by the authorization information in order to provide the delivery agent with the opportunity to select one of the actions. Additionally, it is possible for information associated with the digital key and/or the ShipmentID, such as the name of the shipment recipient and/or the delivery address, to be indicated to the delivery agent, for example.

The delivery agent can then request opening of the parcel box 30 or setup of a communication link to the shipment recipient via the access control apparatus 10 by means of an appropriate confirmation on the hand-held scanner 32. In a step 504, the hand-held scanner 32 captures an input from the delivery agent that a communication link needs to be set up to the shipment recipient via the access control apparatus 10, for example.

The hand-held scanner 32 then sets up a connection (e.g. connection 302) to the access control apparatus 10 of the parcel box 30, for example a Bluetooth connection. To this end, the hand-held scanner 32 can use an MAC address for the access control apparatus 10, which is contained in the digital key that is read or in the supplementary information, in order to allow or speed up connection setup. In some exemplary embodiments, the LockID could also be identical to the MAC address, so that separate inclusion of an MAC address in the digital key or in the supplementary information is not necessary. Connection setup is possible even without knowledge of the MAC address by means of a Bluetooth pairing, however.

When the connection has been set up, the hand-held scanner 32 communicates to the access control apparatus 10 a request to set up a communication link in a step 505, the request containing the digital key. Further, the request contains command information, for example, that indicates that a communication link needs to be set up to a first user apparatus. The supplementary information does not need to be transmitted in this case, since it may be needed only for the operation of the hand-held scanner 32 and for a piece of information to the delivery agent. As an alternative to a Bluetooth connection, it is also possible to use another type of connection, such as an NFC connection or an RFID connection, for example.

The access control apparatus assists connection setup and, in a step 506, receives the request with the digital key via a Bluetooth interface (e.g. the communication interface 14).

In a step 507, the access control apparatus 10 first of all checks the authorization of the request at least in part on the basis of the digital key. The check can comprise different points that can be processed in any order.

As such, the access control apparatus 10 can check whether a LockID contained in the authorization information of the digital key matches the LockID of the access control apparatus 10. The LockID of the access control apparatus 10 may be stored in the memory 12. If there is no match, the process is aborted.

Furthermore, the access control apparatus 10 can check whether the time indicated by an internal clock falls within a period defined by the authorization information. If this is not the case, the process is aborted.

Additionally, the access control apparatus 10 could take an internal counter as a basis for checking whether the same digital key has already been transmitted more often than permitted in accordance with an indication in a "MaxUses" parameter. If this is the case, the process is aborted.

Furthermore, the access control apparatus 10 can check the authenticity and integrity of the authorization information. As such, the access control apparatus 10 can decrypt checking information encrypted using key S1 in the digital key using a key S2 stored in the memory 12. The decrypted checking information can then be compared with the authorization information. If the pieces of information do not match, the process is aborted. Alternatively, the access control apparatus 10 can check a signature generated using key S1 as checking information in the digital key using a key S2 stored in the memory 12. If the signature cannot be validated, the process is aborted. It goes without saying that both an encryption and a signature can additionally involve a hash function being applied and being taken into account for the check.

If the result of all of the checks was positive on the other hand, then the access control apparatus sets up a communication link to the mobile telephone 31 of the shipment recipient in step 508 or causes such a communication link to be set up. For example, the access control apparatus uses the contact information stored in the memory 12 for the mobile telephone 31 (e.g. the telephone number of the mobile telephone 31 and/or of a SIM card contained therein) to set up the connection 301 via a mobile radio network in step 508, so that a communication between the delivery agent 34 and the shipment recipient 33 is possible, for example via the connection 302 and the connection 301. By way of example, the access control apparatus 10 is configured to convey information (e.g. data) between the connections 301 and 302. In this case, the communication link comprises the connections 301 and 302, for example.

By way of example, the communication link allows a text, voice and/or video communication. For example, the delivery agent 34 can describe the situation to the shipment recipient 33 via the communication link, and the shipment recipient 33 can then use the communication link to notify the delivery agent 34 of the location at which the shipment can be delivered (e.g. to a neighbor) and/or picked up (e.g. at the back door) alternatively.

Particular embodiments of the invention therefore allow the usability of delivery agent devices that can communicate with an access control apparatus of a parcel box to be extended in order to be able to use the access control apparatus to communicate with a shipment recipient. A particular advantage in this case is that the delivery agent and the delivery agent device and also other third parties are not provided with access to the contact information, since the contact information is stored only in the access control apparatus.

It goes without saying that the system described and the methods described merely explain the invention by way of example. The system can be modified by adding, altering and omitting components, and the methods can be modified by adding, altering and omitting steps. Some steps can also be performed in different orders, and single steps can also be performed by different components than described.

The exemplary embodiments of the present invention that are described in this specification are also intended to be understood as disclosed in all combinations with one another. In particular, the description of a feature that an embodiment comprises is—unless explicitly explained to the contrary—also not intended to be understood, in the present case, to mean that the feature is indispensable or essential for the function of the exemplary embodiment. The sequence of the method steps outlined in this specification in the individual flowcharts is not imperative, and alternative sequences of the method steps are conceivable. The method steps can be implemented in different ways, and an implementation in software (by virtue of program instructions), hardware or a combination of the two is thus conceivable for implementing the method steps.

Terms used in the patent claims such as "comprise", "have", "include", "contain" and the like do not exclude further elements or steps. The wording "at least in part" covers both the "in part" case and the "completely" case. The wording "and/or" is intended to be understood to mean that both the alternative and the combination are intended to be disclosed, that is to say that "A and/or B" means "(A) or (B) or (A and B)". Within the context of this specification, a plurality of units, persons or the like means multiple units, persons or the like. The use of the indefinite article does not exclude a plurality. A single device can perform the functions of multiple units or devices cited in the patent claims. Reference symbols specified in the patent claims are not intended to be regarded as limitations for the means and steps employed.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, performed by an access control apparatus, the method comprising:
    obtaining a request to set up a communication link, wherein the request contains authorization information, wherein the authorization information is at least in part encrypted;
    checking the authorization of the request to set up a communication link at least in part on the basis of the authorization information, wherein checking the authorization of the request comprises:
        decrypting the encrypted authorization information; and
        comparing the decrypted authorization information with unencrypted information, wherein the unencrypted information is likewise contained in the authorization information, derived from contained information and/or stored in the access control apparatus;

causing setup of and/or setting up a communication link to a first user apparatus only if the result of the checking is that the request to set up a communication link is authorized; and wherein the request is obtained at the access control apparatus from a second user apparatus and/or from a user of the second user apparatus, and wherein the communication link is set up between the first user apparatus and the second user apparatus.

2. The method according to claim 1, wherein the request contains one or more pieces of checking information, particularly a digital signature, and wherein checking the authorization of the request comprises a check on the checking information.

3. The method according to claim 1, the method further comprising:

holding one or more pieces of contact information, wherein the contact information comprises details for contacting the first user apparatus.

4. The method according to claim 1, wherein the second user apparatus is selected from the group consisting of a portable electronic device, a portable electronic device of a delivery agent, a hand-held scanner, a mobile communication device, and combinations thereof.

5. The method according to claim 1, wherein the communication link comprises a local connection between the access control apparatus and the second user apparatus.

6. The method according to claim 1, wherein the communication link comprises a connection via a transregional communication network between the first user apparatus and the second user apparatus.

7. The method according to claim 6, wherein causing setup of the communication link to the first user apparatus comprises the following:

communicating to the first user apparatus a request to set up a communication link to the second user apparatus.

8. The method according to claim 1, wherein the communication link comprises a connection via a transregional communication network between the access control apparatus and the first user apparatus.

9. The method according to claim 1, wherein the access control apparatus:

is fitted at a fixed location and/or
controls access to a receiving unit for receiving a shipment and/or
is fitted in or to a parcel box and/or
is part of a locking system of a parcel box and/or
is fitted in or to a parcel butler and/or
is part of a locking system of a parcel butler and/or
is part of a receiving unit for receiving a shipment.

10. The method according to claim 1, wherein the first user apparatus is selected from the group consisting of a portable electronic device, a portable electronic device of a shipment recipient, a hand-held scanner, a mobile communication device, and combinations thereof.

11. An access control apparatus, comprising:

at least one memory having program instructions for carrying out a method and at least one processor designed to execute the program instructions from the at least one memory, the method comprising the steps of:

obtaining a request to set up a communication link, wherein the request contains authorization information, wherein the authorization information is at least in part encrypted;

checking the authorization of the request to set up a communication link at least in part on the basis of the authorization information, wherein checking the authorization of the request comprises:

decrypting the encrypted authorization information; and comparing the decrypted authorization information with unencrypted information, wherein the unencrypted information is likewise contained in the authorization information, derived from contained information and/or stored in the access control apparatus;

causing setup of and/or setting up a communication link to a first user apparatus only if the result of the checking is that the request to set up a communication link is authorized; and wherein the request is obtained at the access control apparatus from a second user apparatus and/or from a user of the second user apparatus, and wherein the communication link is set up between the first user apparatus and the second user apparatus.

12. The access control apparatus according to claim 11, wherein the means comprise at least one memory having program instructions of a non-transitory, machine-readable medium and at least one processor designed to execute program instructions from the at least one memory.

13. A non-transitory, machine-readable medium, comprising program instructions that are designed, when executed by at least one processor, to cause an apparatus to perform the steps of:

obtaining a request to set up a communication link, wherein the request contains authorization information, wherein the authorization information is at least in part encrypted;

checking the authorization of the request to set up a communication link at least in part on the basis of the authorization information, wherein checking the authorization of the request comprises:

decrypting the encrypted authorization information; and comparing the decrypted authorization information with unencrypted information, wherein the unencrypted information is likewise contained in the authorization information, derived from contained information and/or stored in the access control apparatus;

causing setup of and/or setting up a communication link to a first user apparatus only if the result of the checking is that the request to set up a communication link is authorized; and wherein the request is obtained at an access control apparatus from a second user apparatus and/or from a user of the second user apparatus, and wherein the communication link is set up between the first user apparatus and the second user apparatus.

14. A method, performed by a server, the method comprising:

obtaining a request to compile and/or generate authorization information that authorizes setup of a communication link via an access control apparatus;

compiling and/or generating the authorization information at least partially based on the obtained request, wherein the authorization information allows the access control apparatus to check the authorization to set up the communication link, and wherein the authorization information is based at least in part on the obtained request; and causing communication of and/or communicating the authorization information to a second user apparatus in order to authorize the second user apparatus to request setup of a communication link via the access control apparatus.

15. A server, comprising:
means configured to perform the method according to claim 14 or comprising respective means for performing the steps of the method according to claim 14.

16. A server according to claim 15, wherein the means comprise at least one memory having program instructions of a non-transitory, machine-readable medium and at least one processor designed to execute program instructions from the at least one memory.

17. A non-transitory, machine-readable medium, comprising program instructions that are designed, when executed by at least one processor, to cause a server to perform the method according to claim 14.

18. A system, comprising:
an access control apparatus according to claim 11; and
a server, comprising means configured to perform a method or comprising respective means for performing the steps of a method, the method including the steps of:
  obtaining a request to compile and/or generate authorization information that authorizes setup of a communication link via an access control apparatus;
  compiling and/or generating the authorization information, wherein the authorization information allows the access control apparatus to check the authorization to set up the communication link, and wherein the authorization information is based at least in part on the obtained request; and
  causing communication of and/or communicating the authorization information to a second user apparatus in order to authorize the second user apparatus to request setup of a communication link via the access control apparatus.

* * * * *